(12) United States Patent  
Imi

(10) Patent No.: US 9,168,644 B2
(45) Date of Patent: Oct. 27, 2015

(54) FASTENING AND LOOSENING DEVICE FOR STUD BOLTS AND NUTS OF A REACTOR VESSEL

(75) Inventor: Katsumi Imi, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 359 days.

(21) Appl. No.: 13/881,647

(22) PCT Filed: Jan. 26, 2012

(86) PCT No.: PCT/JP2012/051687
§ 371 (c)(1),
(2), (4) Date: Apr. 25, 2013

(87) PCT Pub. No.: WO2012/105410
PCT Pub. Date: Aug. 9, 2012

(65) Prior Publication Data
US 2013/0205575 A1    Aug. 15, 2013

(30) Foreign Application Priority Data
Feb. 1, 2011  (JP) ................................. 2011-020155

(51) Int. Cl.
*B23P 17/00* (2006.01)
*B25B 21/00* (2006.01)
(Continued)

(52) U.S. Cl.
CPC ............. *B25B 21/002* (2013.01); *B23P 19/067* (2013.01); *B25B 29/02* (2013.01); *G21C 19/02* (2013.01);
(Continued)

(58) Field of Classification Search
CPC ..... B25B 21/002; B25B 29/02; B23P 19/067; G21C 19/20; G21C 19/02; G21C 13/073; Y10T 29/49948; Y10T 29/53991; Y10T 29/53687
See application file for complete search history.

(56) References Cited

U.S. PATENT DOCUMENTS 4,273,011 A * 6/1981 Exner et al. .................. 81/57.38
4,433,828 A   2/1984 Spiegelman et al.
(Continued)

FOREIGN PATENT DOCUMENTS

JP    58-114867 A    7/1983
JP    59-37065 A     2/1984
(Continued)

OTHER PUBLICATIONS

International Search Report for PCT/JP2012/051687, mailing date of May 1, 2012.
(Continued)

*Primary Examiner* — Ryan J Walters
(74) *Attorney, Agent, or Firm* — Westerman, Hattori, Daniels & Adrian, LLP

(57) ABSTRACT

A fastening and loosening device is provided with a device main body (101) having an upper portion supported along an arrangement direction of stud bolts (65) in a freely movable manner by a conveyance device (73), a bolt tensioner (102) freely ascendable/descendable with respect to the stud bolts (65) together with the device main body (101) by a lift device (74), a guide device (103) coupled with the device main body (101) in a freely relatively movable manner via a cylinder (121) and having right and left guide members (123 and 124) contactable with an outer periphery of a nut (66) from both the right and left sides of a moving direction of the device main body (101), and a guide position adjustment device (105) capable of moving an inner guide member (123) in a horizontal direction intersecting with the moving direction of the device main body (101).

8 Claims, 15 Drawing Sheets

(51) Int. Cl.
  *B23P 19/06* (2006.01)
  *B25B 29/02* (2006.01)
  *G21C 19/02* (2006.01)
  *G21C 19/20* (2006.01)
  *G21C 13/073* (2006.01)

(52) U.S. Cl.
  CPC .............. *G21C 19/20* (2013.01); *G21C 13/073* (2013.01); *Y10T 29/49948* (2015.01); *Y10T 29/53687* (2015.01); *Y10T 29/53991* (2015.01)

(56) References Cited

U.S. PATENT DOCUMENTS

| | | |
|---|---|---|
| 4,520,446 A | 5/1985 | Sato |
| 4,883,185 A | 11/1989 | Fujitani et al. |
| 2005/0141967 A1 | 6/2005 | Giles et al. |

FOREIGN PATENT DOCUMENTS

| | | |
|---|---|---|
| JP | 60-180781 A | 9/1985 |
| JP | 60-057996 B2 | 12/1985 |
| JP | 63-047872 U | 3/1988 |
| JP | 9-011065 A | 1/1997 |
| JP | 9-145880 A | 6/1997 |
| JP | 10-180571 A | 7/1998 |
| JP | 10-227888 A | 8/1998 |
| JP | 2010-112422 A | 5/2010 |
| JP | 2012-57690 A | 3/2012 |

OTHER PUBLICATIONS

Written Opinion of PCT/JP2012/051687, mailing date of May 1, 2012.

Japanese Notice of Allowance dated Oct. 21, 2014, issued in Japanese Patent Application No. 2011-020155, w/ English translation (6 pages).

* cited by examiner

FASTENING AND LOOSENING DEVICE FOR STUD BOLTS AND NUTS OF A REACTOR VESSEL

FIELD

The present invention relates to a fastening and loosening device that rotates and fastens a nut with causing tension to act on a stud bolt when a cover is attached to an upper portion of a reactor vessel, or rotates and loosen the nut with causing tension to act on the stud bolt when the cover fixed to the upper portion of the reactor vessel is removed, for example.

BACKGROUND

For example, a pressurized water reactor (PWR) uses light water as a reactor coolant and a neutron moderator, fills a reactor core with not-boiled, high-temperature and high-pressure water, sends the high-temperature and high-pressure water to a steam generator to generate steam by heat exchange, and sends the steam to a turbine generator to generate power.

A reactor vessel used for such a pressurized water reactor is constructed of a reactor vessel main body and a reactor vessel cover mounted on the reactor vessel main body so that a reactor-internal structure can be inserted in the reactor vessel, and the reactor vessel cover is openable/closable with respect to the reactor vessel main body. Further, when the reactor vessel cover is mounted on the reactor vessel main body in a freely attachable/detachable manner, a stud bolt is caused to penetrate an outer peripheral flange of the reactor vessel cover and is screwed in and embedded in an upper outer peripheral flange of the reactor vessel main body, and a nut is screwed with the stud bolt with tension acting on the stud bolt, so that fastening is performed.

Such a fastening and loosening device is disclosed in Patent Literature 1 described below. A device disclosed in Patent Literature 1 performs work using a bolt tensioner.

CITATION LIST

Patent Literature

Patent Literature 1: Japanese Patent Application Laid-open No. 10-227888

SUMMARY

Technical Problem

When a nut is rotated with respect to a stud bolt using the above-described fastening and loosening device and a reactor vessel cover is removed from a reactor vessel main body, a plurality of stud bolts and nuts is provided along each outer peripheral flange of the reactor vessel main body and the reactor vessel cover. Therefore, the work is performed with the device being moved along the direction. In this case, before performing the fastening and loosening work, it is necessary to position the bolt tensioner into proper positions with respect to the stud bolts and nuts, and for example, the fastening and loosening device is caused to be freely movable along an arrangement direction of the stud bolts and nuts by a guide device.

By the way, the reactor vessel differs in size depending on a position where a reactor is disposed, power generation capacity of a plant, and the like. An outer diameter of each outer peripheral flange of the reactor vessel main body and the reactor vessel cover, an outer diameter and the number of the stud bolts and nuts, and the like differ. Therefore, since the guide device that guides the fastening and loosening device differs in shape and size depending on the size of the reactor vessel, it is necessary to prepare the fastening and loosening device for each reactor vessel, and there is a problem of rising a cost of facilities.

The present invention solves the above-described problem, and an object of the present invention is to provide a fastening and loosening device enables proper fastening and loosening of a nut with respect to a stud bolt regardless of the size and shape of a member to be fastened.

Solution To Problem

According to an aspect of the present invention, a fastening and loosening device having a plurality of stud bolts screwed in an object to be fastened and arranged and nuts respectively screwed with the stud bolts, and rotating the nut with causing tension to act on the stud bolt in a shaft center direction away from the object to be fastened to perform fastening or loosening, includes: a device main body having an upper portion movably supported along an arrangement direction of the stud bolts; a bolt tensioner supported by the device main body and being freely movable along the shaft center direction of the stud bolts; a guide device provided in a lower portion of the device main body and having right and left guide members contactable with an outer periphery of the nut from both right and left sides of a moving direction of the device main body; and a guide position adjustment device capable of moving at least one of the right and left guide members in a horizontal direction intersecting with the moving direction of the device main body.

Therefore, the right and left guide members can guide the device main body by contacting with the outer periphery of the nut from both the right and left sides of the device main body, and the guide member is moved in the horizontal direction intersecting with the moving direction of the device main body by the guide position adjustment device, so that the guide position of the guide member with respect to the nut can be adjusted. Therefore, the guide member can properly guide the device main body regardless of the size and shape of the member to be fastened, and as a result, the fastening and loosening of the nut with respect to the stud bolt can be properly performed.

In the fastening and loosening device, the arrangement direction of the stud bolts is a circumferential direction along an outer periphery of the object to be fastened, and the guide device allows the guide member positioned at an inner side of the circumferential direction to be movable by the guide position adjustment device.

Therefore, the guide member positioned at the inner side of the circumferential direction is moved by the guide position adjustment device, so that the guide position of the guide member with respect to the nut is adjusted, and position adjustment of the guide member can be easily performed with a simple configuration.

The fastening and loosening device, further includes a positioning device having a positioning member inserted between adjacent nuts from an outside of the circumferential direction.

Therefore, the positioning member is inserted between the nuts from the other side of the guide member by the positioning device, whereby proper positioning of the device main body can be performed.

The fastening and loosening device, further includes an insertion position adjustment device capable of adjusting an insertion position of the positioning member.

Therefore, since the position where the positioning member is inserted can be adjusted by the insertion position adjustment device, the positioning member can properly position the device main body regardless of the size and shape of the member to be fastened. As a result, the fastening and loosening of the nut with respect to the stud bolt can be properly performed.

In the fastening and loosening device, the guide position adjustment device includes a support shaft supporting one end portion of the guide member in a freely rotatable manner, and an eccentric mechanism allowing the other end portion of the guide member to be movable.

Therefore, by simply actuating the eccentric mechanism, the guide position of the guide member can be easily changed, and the device can be simplified.

In the fastening and loosening device, the guide device is constructed of the right and left guide members fixed to a lower portion of a box body with a predetermined interval, and the guide position adjustment device is capable of horizontally swinging the box body.

Therefore, the box body is swung by the guide position adjustment device to adjust the position of the guide member, whereby versatility can be improved by sufficiently securing a position adjustment margin.

In the fastening and loosening device, the guide devices are provided before and behind the bolt tensioner in the moving direction of the device main body, and the guide member is contactable with the outer peripheries of two or more of the nuts.

Therefore, the movement of the device main body is guided before and behind the bolt tensioner by the guide devices, whereby the device can be stably moved and guided.

Advantageous Effects of Invention

According to a fastening and loosening device of the present invention, a guide device having right and left guide members contactable with an outer periphery of a nut from both the right and left sides of a moving direction of a device main body, and a guide position adjustment device capable of moving at least one of the guide members in a horizontal direction intersecting with the moving direction of the device main body are provided. Therefore, fastening and loosening of a nut with respect to a stud bolt can be properly performed regardless of the size and shape of a member to be fastened.

BRIEF DESCRIPTION OF DRAWINGS

FIG. 7-1 is a schematic view illustrating an actuation of the bolt tensioner.

FIG. 7-2 is a schematic view illustrating an actuation of the bolt tensioner.

FIG. 7-3 is a schematic view illustrating an actuation of the bolt tensioner.

FIG. 7-4 is a schematic view illustrating an actuation of the bolt tensioner.

FIG. 7-5 is a schematic view illustrating an actuation of the bolt tensioner.

DESCRIPTION OF EMBODIMENTS

Hereinafter, preferred embodiments of a fastening and loosening device according to the present invention will be described in detail with reference to the appended drawings. Note that the present invention is not limited by these embodiments and includes configuration made by combining the embodiments where there is a plurality of embodiments.

First Embodiment

Figure 1:
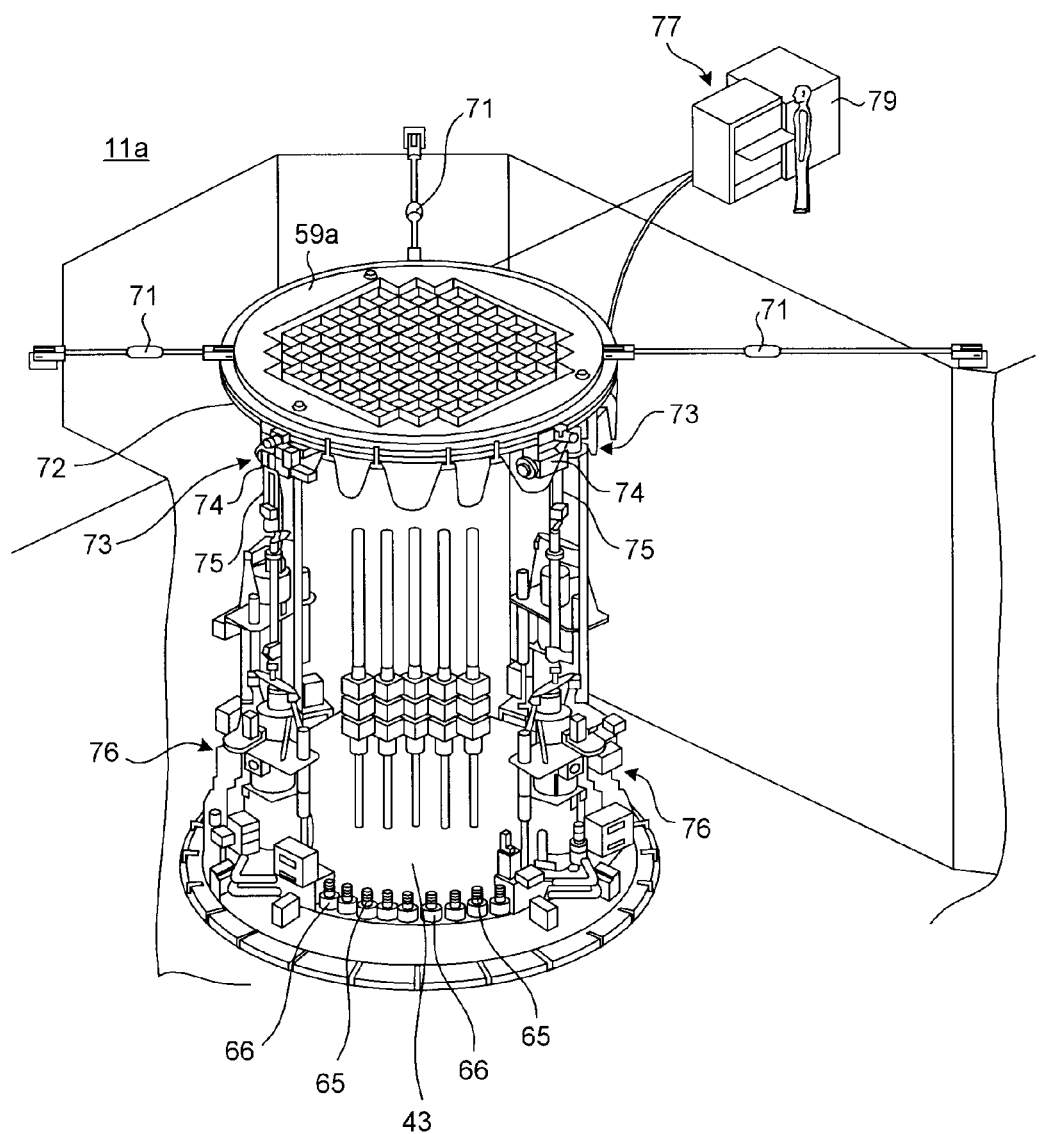
FIG. 1 is a perspective view illustrating a whole configuration of a fastening and loosening device according to a first embodiment of the present invention.
Figure 2:
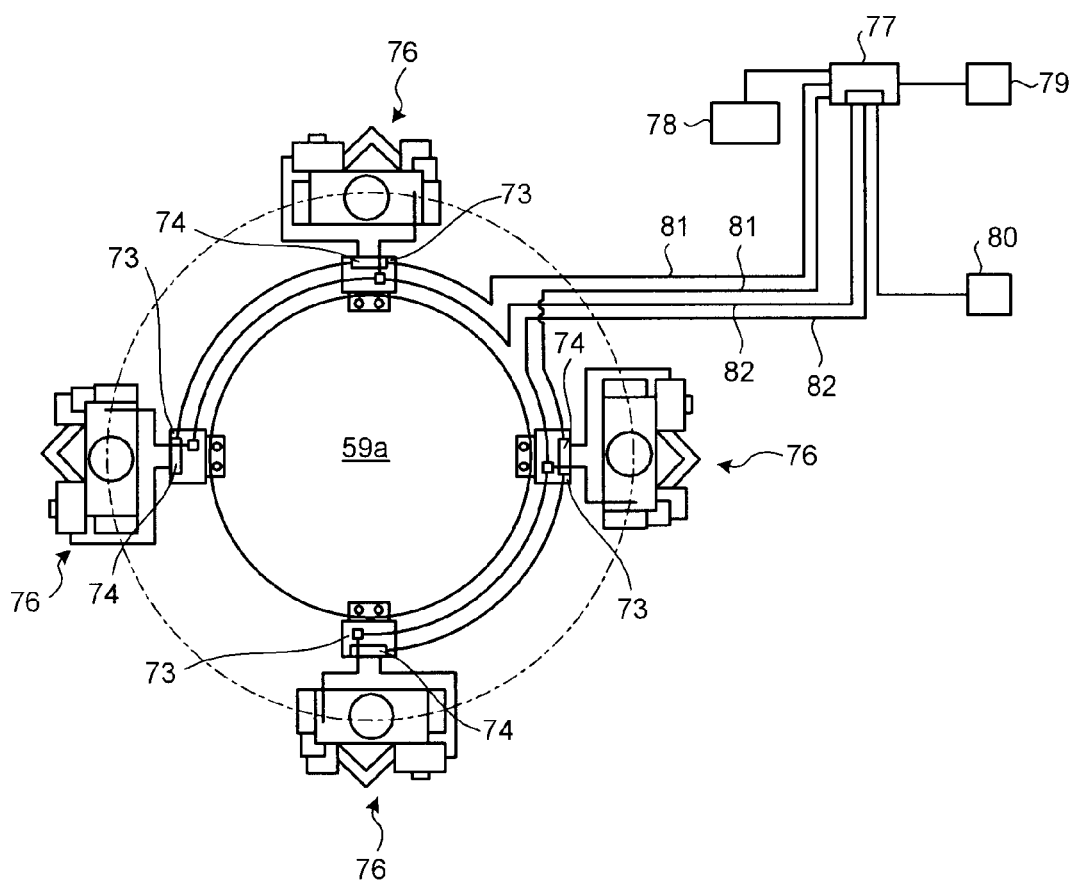
FIG. 2 is a plan view illustrating a whole configuration of the fastening and loosening device of the first embodiment.
Figure 3:
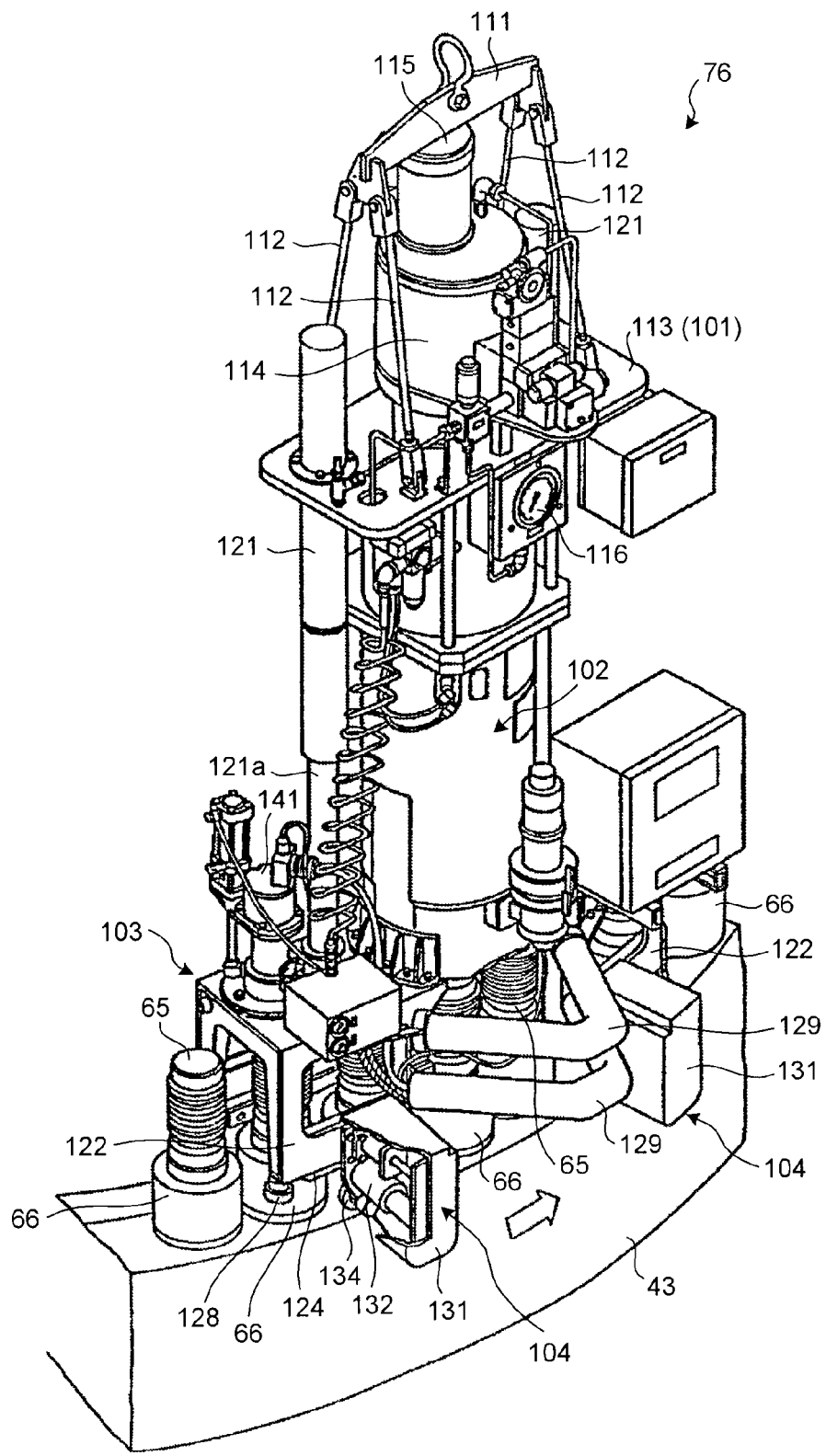
FIG. 3 is a perspective view illustrating the fastening and loosening device of the first embodiment.
Figure 4:
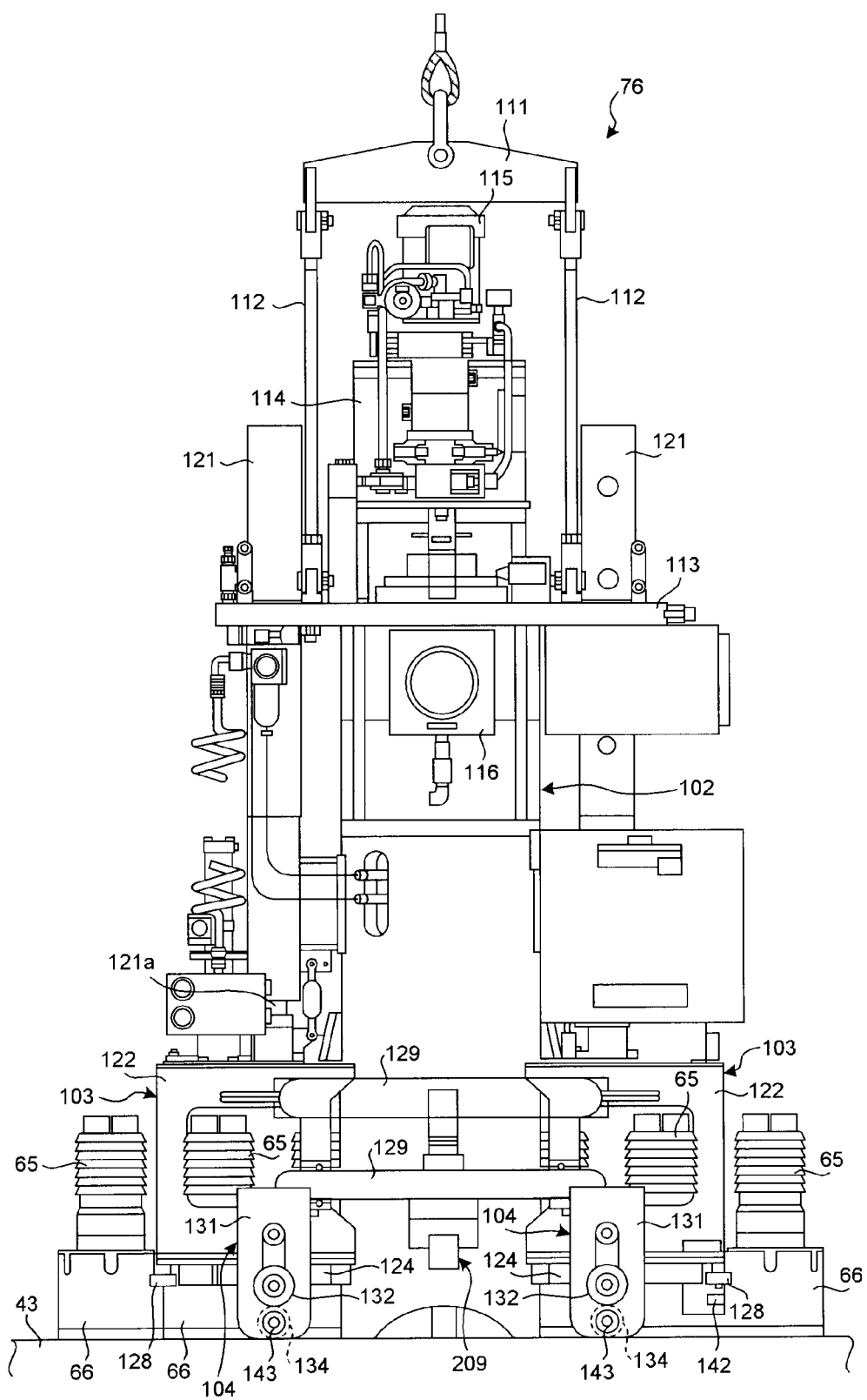
FIG. 4 is a front view illustrating the fastening and loosening device of the first embodiment.
Figure 5:
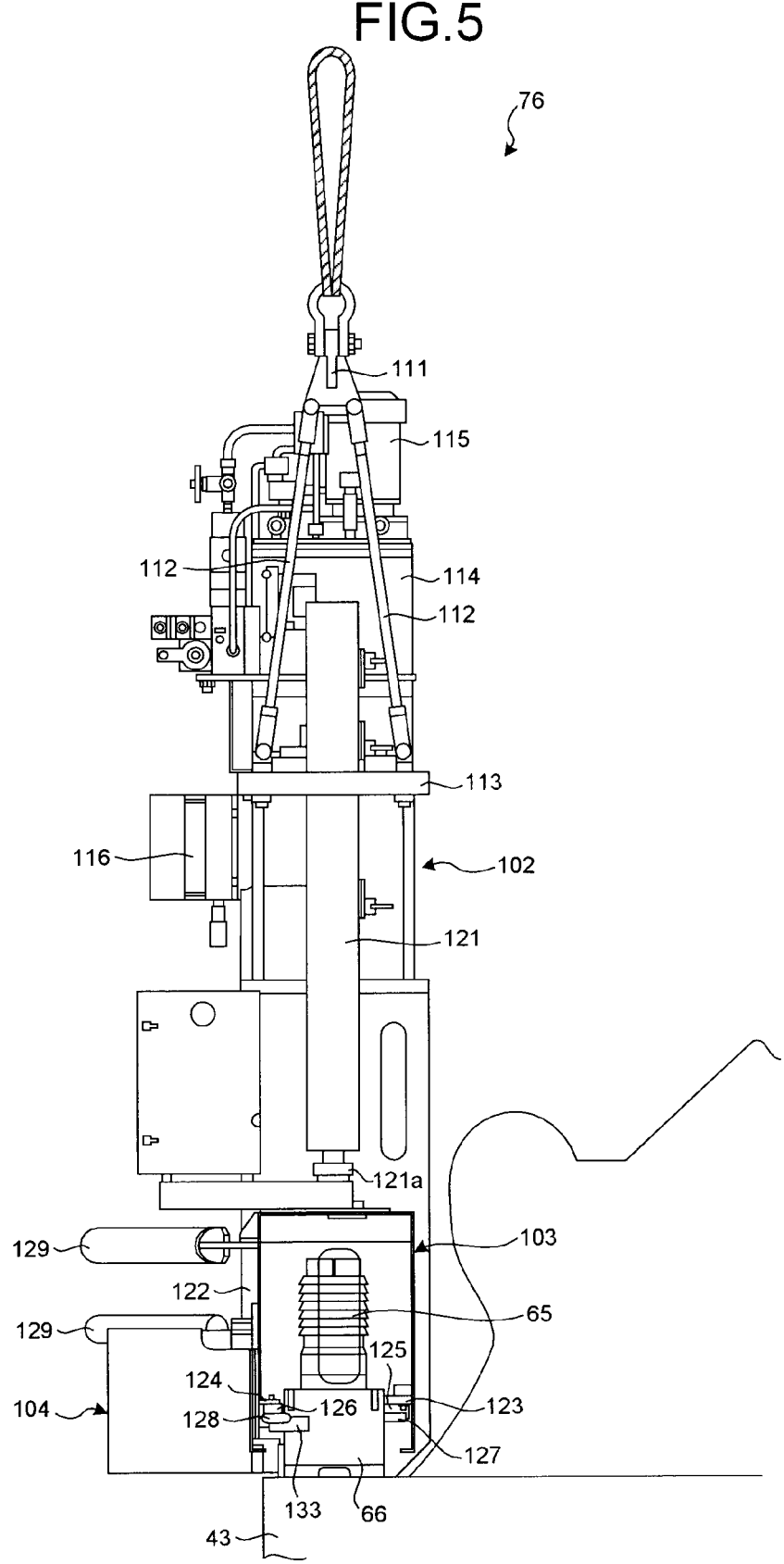
FIG. 5 is a side view illustrating the fastening and loosening device of the first embodiment.
Figure 6:
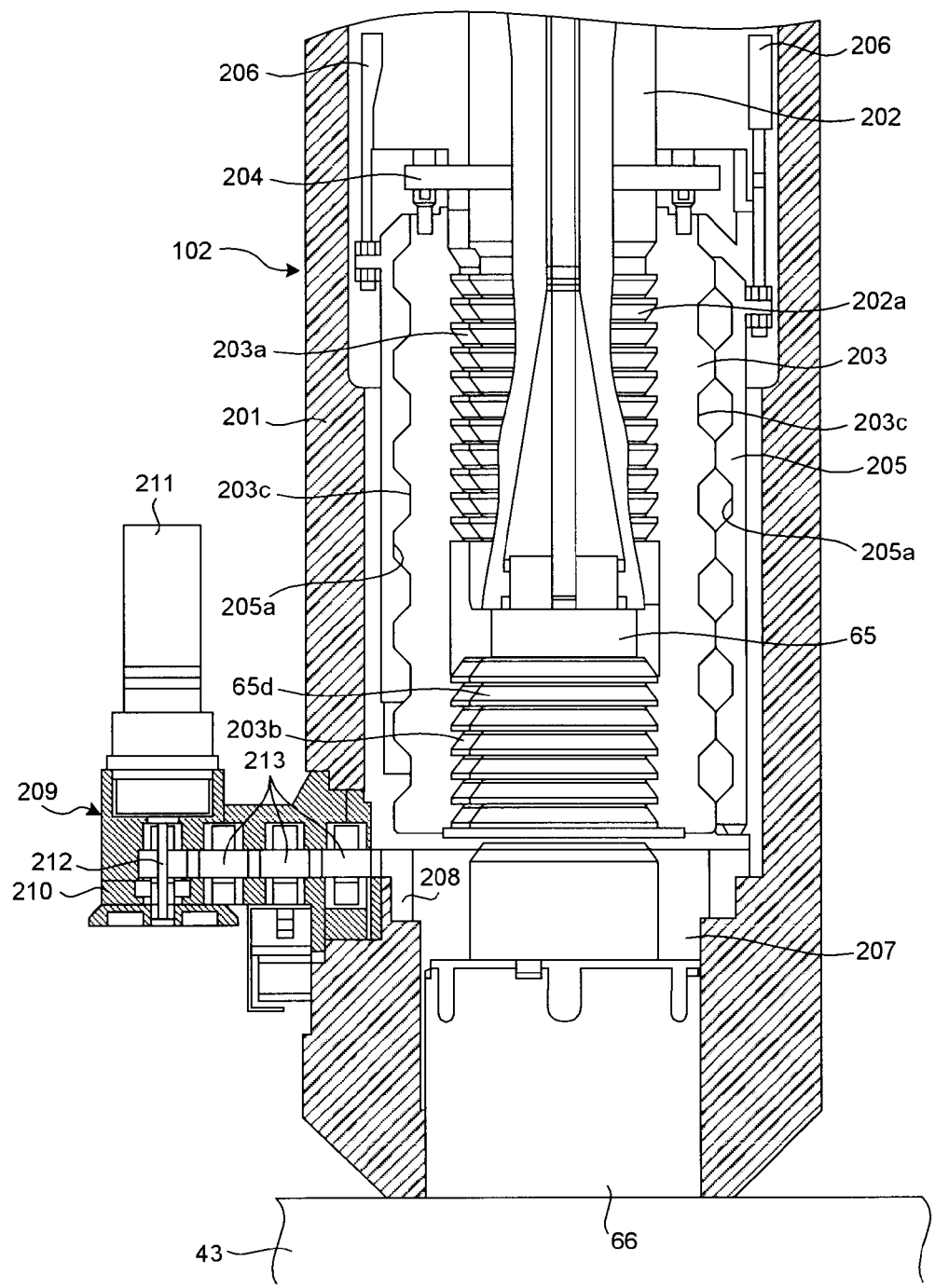
FIG. 6 is a cross sectional view illustrating a bolt tensioner.
Figures 1, 7:
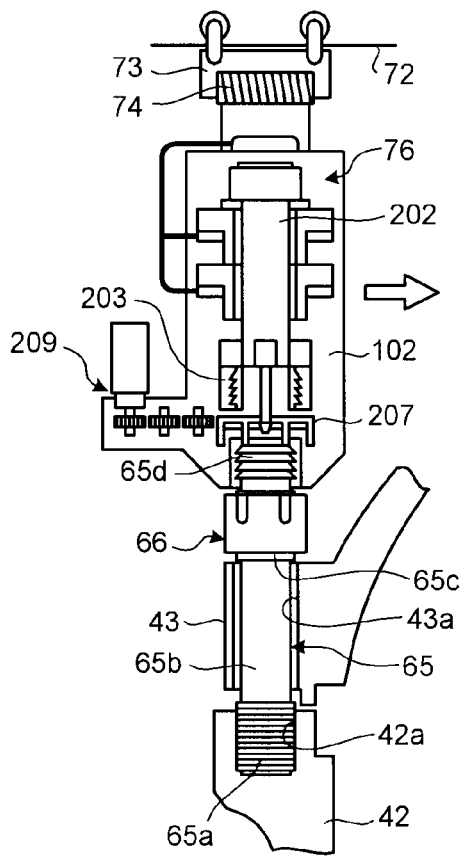
Figures 2, 7:
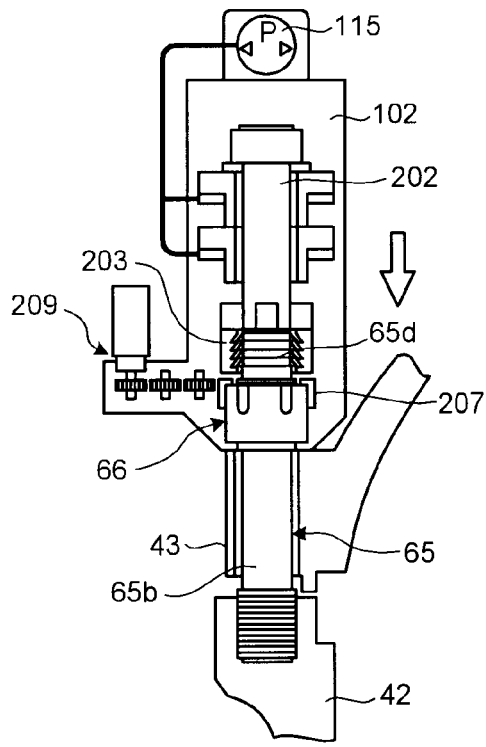
Figures 3, 7:
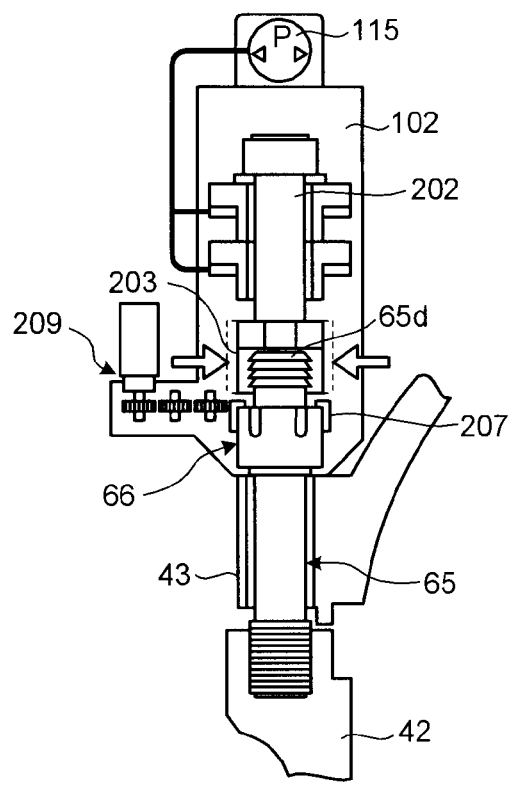
Figures 4, 7:
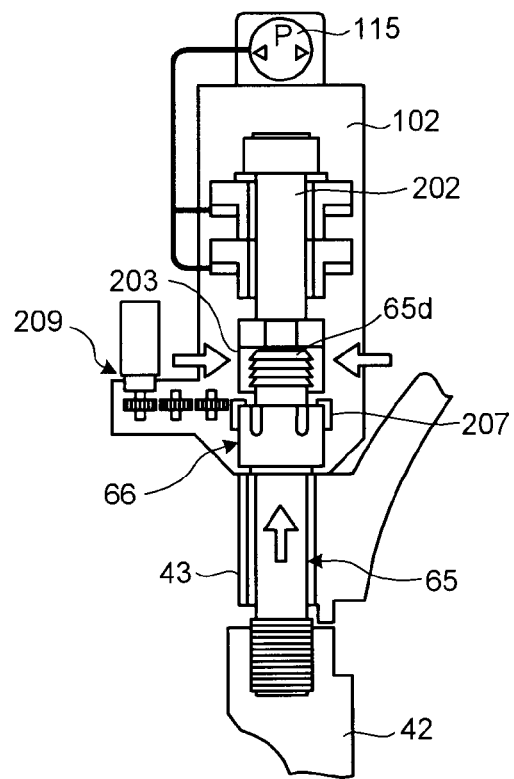
Figures 5, 7:
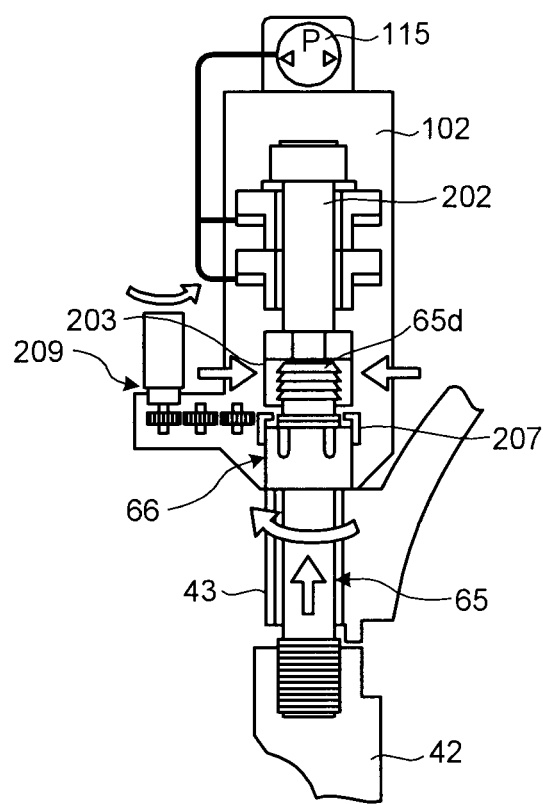
Figure 8:
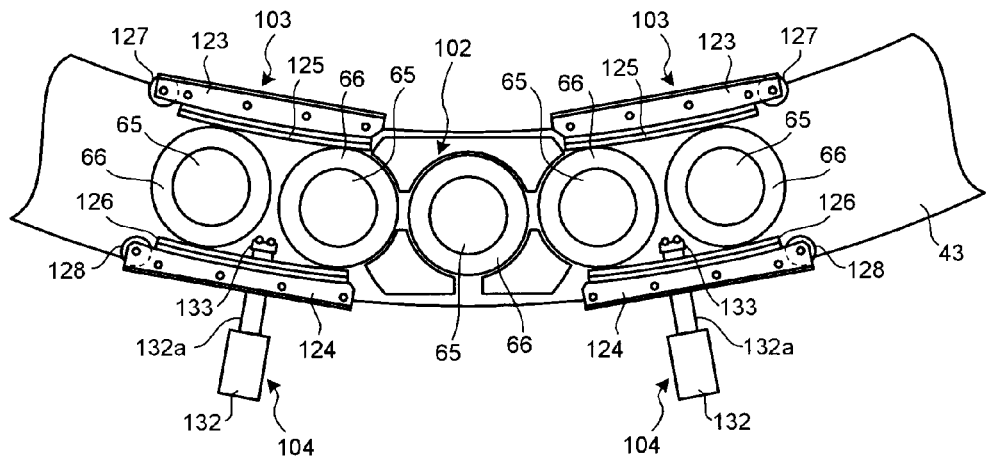
FIG. 8 is a plan view illustrating a guide device in the fastening and loosening device of the first embodiment.
Figure 9:
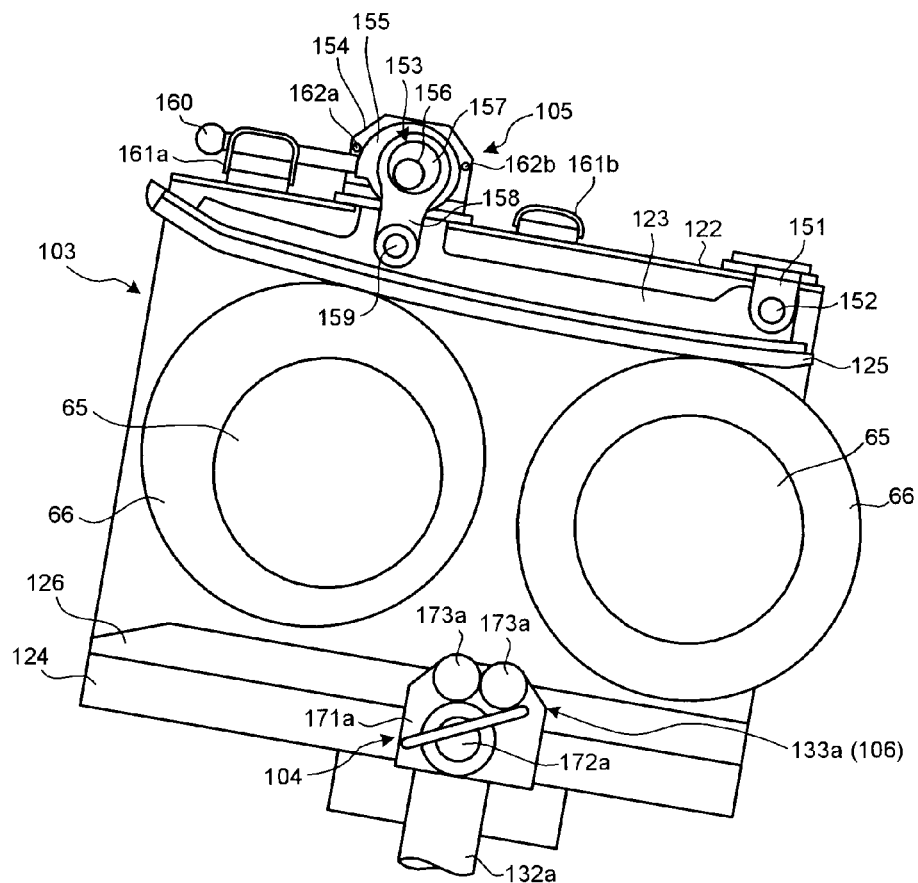
FIG. 9 is a plan view illustrating a guide position adjustment device and an insertion position adjustment device.
Figure 10:
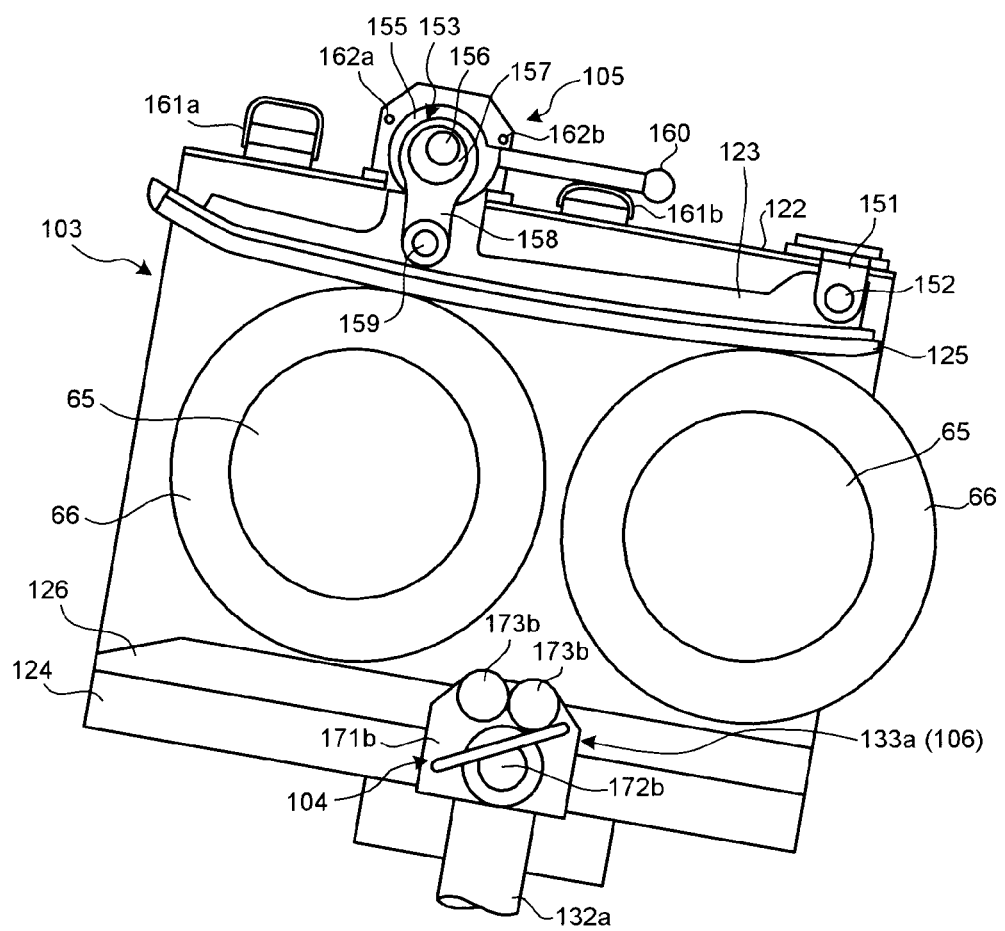
FIG. 10 is a plan view illustrating an actuation of the guide position adjustment device and the insertion position adjustment device.
Figure 11:
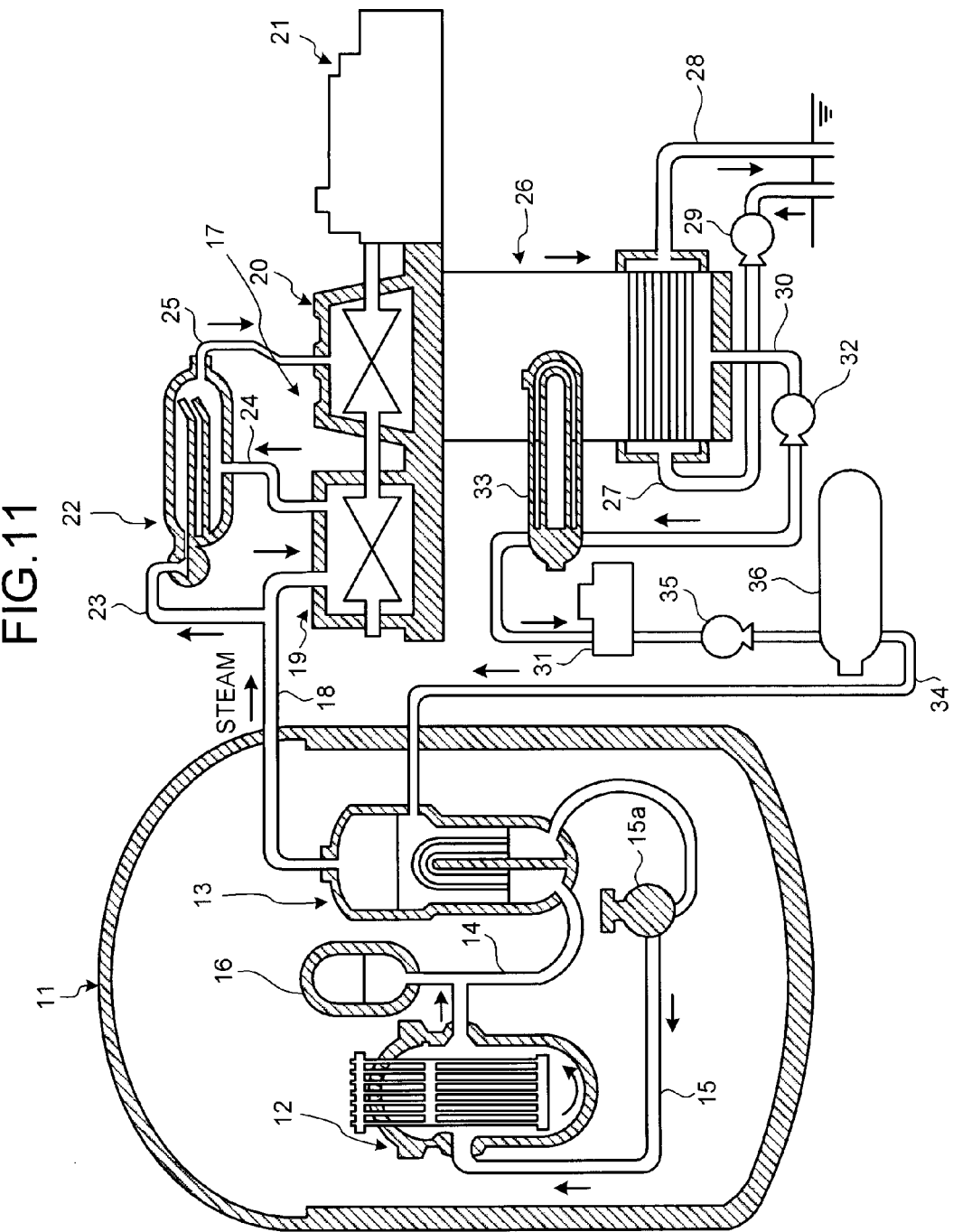
FIG. 11 is a schematic configuration diagram of a nuclear power plant.
Figure 12:
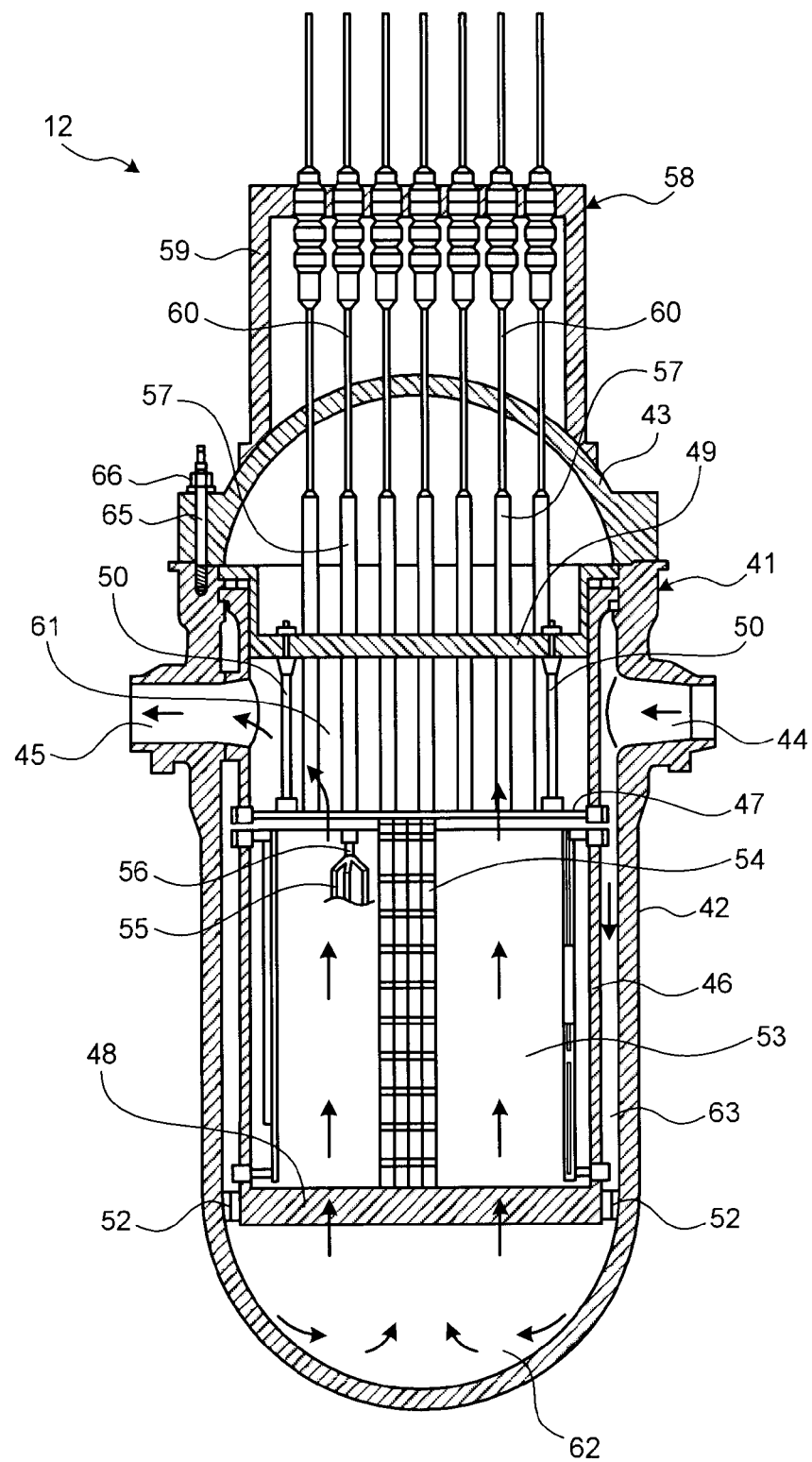
FIG. 12 is a longitudinal sectional view illustrating a pressurized water reactor.

FIG. 1 is a perspective view illustrating a whole configuration of a fastening and loosening device according to the first embodiment of the present invention, FIG. 2 is a plan view illustrating the whole configuration of the fastening and loosening device of the first embodiment, FIG. 3 is a perspective view illustrating the fastening and loosening device of the first embodiment, FIG. 4 is a front view illustrating the fastening and loosening device of the first embodiment, FIG. 5 is a side view illustrating the fastening and loosening device of the first embodiment, FIG. 6 is a cross sectional view illustrating a bolt tensioner, FIGS. 7-1 to 7-5 are schematic views illustrating actuations of the bolt tensioner, FIG. 8 is a plan view illustrating a guide device in the fastening and loosening device of the first embodiment, FIG. 9 is a plan view illustrating a guide position adjustment device and an insertion position adjustment device, FIG. 10 is a plane view of an actuation of the guide position adjustment device and the insertion position adjustment device, FIG. 11 is a schematic configuration diagram of a nuclear power plant, and FIG. 12 is a longitudinal sectional view illustrating a pressurized water reactor.

A reactor of the first embodiment is a pressurized water reactor (PWR) that uses light water as a reactor coolant and a neutron moderator, fills the entire reactor core with not-boiled, high-temperature and high-pressure water, sends the high-temperature and high-pressure water to a steam generator to generate steam by heat exchange, and sends the steam to a turbine generator to generate power.

In a nuclear power plant that has the pressurized water reactor of the first embodiment, as illustrated in FIG. 11, a pressurized water reactor 12 and a steam generator 13 are housed in a containment 11, the pressurized water reactor 12 and the steam generator 13 are coupled with each other via cooling water pipes 14 and 15, the cooling water pipe 14 is provided with a pressurizer 16, and the cooling water pipe 15 is provided with a cooling water pump 15*a*. In this case, light water is used as a moderator and primary cooling water (a coolant), and a primary cooling system maintains a high-pressure condition of about 150 to 160 atmospheres with the pressurizer 16 in order to suppress boiling of the primary cooling water in a reactor core part. Therefore, the light water as the primary cooling water is heated by low-enriched uranium or MOX as fuel (nuclear fuel) in the pressurized water reactor 12, and the high-temperature primary cooling water is sent to the steam generator 13 through the cooling water pipe 14 with predetermined high pressure maintained by the pressurizer 16. In this steam generator 13, heat exchange is performed between the high-pressure and high-temperature primary cooling water and secondary cooling water, and the cooled primary cooling water is returned to the pressurized water reactor 12 through the cooling water pipe 15.

The steam generator 13 is coupled with a steam turbine 17 via a cooling water pipe 18, and the steam turbine 17 has a high-pressure turbine 19 and a low-pressure turbine 20, and is connected with a generator 21. Further, a moisture separator/heater 22 is provided between the high-pressure turbine 19 and the low-pressure turbine 20, a cooling water branch pipe 23 branched from the cooling water pipe 18 is coupled with the moisture separator/heater 22, the high-pressure turbine 19 and the moisture separator/heater 22 are coupled with each other by a low-temperature reheat pipe 24, and the moisture separator/heater 22 and the low-pressure turbine 20 are coupled with each other by a high-temperature reheat pipe 25.

Further, the low-pressure turbine 20 of the steam turbine 17 has a condenser 26, and a water intake pipe 27 and a drain pipe 28 that supplies/discharges cooling water (for example, seawater) is coupled with the condenser 26. This water intake pipe 27 has a circulating water pump 29, and the other end of the circulating water pump is disposed in the sea together with the drain pipe 28. The condenser 26 is coupled with a deaerator 31 via a cooling water pipe 30, and the cooling water pipe 30 is provided with a condenser pump 32 and a low-pressure feedwater heater 33. The deaerator 31 is coupled with the steam generator 13 via a cooling water pipe 34, and the cooling water pipe 34 is provided with a feed pump 35 and a high-pressure feedwater heater 36.

Therefore, steam generated by heat exchange with the high-pressure and high-temperature primary cooling water in the steam generator 13 is sent to the steam turbine 17 through the cooling water pipe 18 (from the high-pressure turbine 19 to the low-pressure turbine 20), and the steam turbine 17 is driven by this steam and generate power is performed by the generator 21. At this time, after the steam from the steam generator 13 drives the high-pressure turbine 19, moisture included in the steam is removed in the moisture separator/heater 22 and the steam is heated. Then, the steam drives the low-pressure turbine 20. The steam that has driven the steam turbine 17 is then cooled in the condenser 26 using seawater and becomes condensed water, and is heated in the low-pressure feedwater heater 33 by low-pressure steam extracted from the low-pressure turbine 20, for example. Then, after impurities such as dissolved oxygen and non-condensable gas (ammonia gas) are removed in the deaerator 31, the steam is heated in the high-pressure feedwater heater 36 by high-pressure steam extracted from the high-pressure turbine 19, for example, and is then returned to the steam generator 13.

In the pressurized water reactor 12 constructed in this way and applied to a nuclear power plant, as illustrated in FIG. 12, a reactor vessel 41 is constructed of a reactor vessel main body 42 and a reactor vessel cover 43 mounted on the reactor vessel main body 42 so that an reactor-internal structure can be inserted inside the reactor vessel 41, and the reactor vessel cover 43 is openable/closable with respect to the reactor vessel main body 42. The reactor vessel main body 42 has a cylindrical shape with an upper portion open and a lower portion blockaded in a spherically-shaped manner, and has an inlet nozzle 44 and an outlet nozzle 45 that supplies/discharges the light water (coolant) as the primary cooling water formed on the upper portion.

In the reactor vessel main body 42, a core barrel 46 having a cylindrical shape is disposed below the inlet nozzle 44 and the outlet nozzle 45 with a predetermined gap with an inner surface of the reactor vessel main body 42, an upper core plate 47 having a disk shape and in which a plurality of flow holes (not illustrated) is formed is coupled with an upper portion of the core barrel 46, and, similarly, a lower core support plate 48 having a disk shape and in which a plurality of flow holes (not illustrated) is formed is coupled with a lower portion of the core barrel 46. Further, an upper core support 49 having a disk shape and positioned above the core barrel 46 is fixed in the reactor vessel main body 42, the upper core plate 47, that is, the core barrel 46 is hung and supported from the upper core support 49 via a plurality of reactor core support rods 50. Meanwhile, the lower core support plate 48, that is, the core barrel 46 is positioned and held to an inner surface of the reactor vessel main body 42 by a plurality of radial suppose keys 52.

A reactor core 53 is formed of the core barrel 46, the upper core plate 47, and the lower core support plate 48, and a plurality of fuel assemblies 54 is disposed in the reactor core 53. The fuel assembly 54 is constructed of a plurality of fuel rods (not illustrated) bundled by a support lattice in a lattice-like manner, and an upper nozzle is fixed to an upper end portion and a lower nozzle is fixed to a lower end portion. Further, the plurality of control rods 55 serves as a control rod cluster 56 by upper end portions thereof being put together, and is insertable into the fuel assembly 54. A plurality of control rod cluster guide tubes 57 penetrates the upper core support 49 and is supported by the upper core support 49, and has lower end portions extended to the control rod cluster 56 of the fuel assembly 54.

A magnetic-jack control rod driving mechanism 58 is provided on an upper portion of the reactor vessel cover 43 that constitutes the reactor vessel 41, and is housed in a housing 59 that constitutes an integral part with the reactor vessel cover 43. Upper end portions of the plurality of control rod cluster guide tubes 57 are extended to the control rod driving mechanism 58. Control rod cluster drive shafts 60 extended from the control rod driving mechanism 58 pass through the control rod cluster guide tubes 57 and are extended to the fuel assembly 54, and are capable of holding the control rod cluster 56. Further, a plurality of reactor-internal instrumentation guide tubes (not illustrated) penetrates the upper core support 49 and is supported by the upper core support 49, has lower end portions extended to the fuel assembly 54, and has sensors insertable therein, which is capable of measuring a neutron flux.

The control rod driving mechanism 58 is vertically extended and is coupled to the control rod cluster 56, and upwardly and downwardly moves, by a magnetic jack, the control rod cluster drive shaft 60 that has a plurality of circumferential grooves arranged on a surface with equal pitches in a longitudinal direction, so that an output of the reactor is controlled.

Therefore, the control rod cluster drive shaft 60 is moved by the control rod driving mechanism 58 and the control rod 55 is inserted to the fuel assembly 54, so that nuclear fission in the reactor core 53 is controlled. The light water filled in the reactor vessel 41 is heated by generated thermal energy, and the high-temperature light water is discharged from the outlet nozzle 45 and is sent to the steam generator 13, as described above. That is, the neutrons are irradiated by uranium or plutonium as fuel that constitutes the fuel assembly 54 subjected to the nuclear fission, and the light water as a moderator and the primary cooling water lowers kinetic energy of the irradiated fast neutrons and causes them to be thermal neutrons, so that the new nuclear fission is facilitated and the generated heat is taken and cooled. Further, the number of neutrons generated in the reactor core 53 is adjusted by insertion of the control rod 55 to the fuel assembly 54, and when the reactor is subjected to emergency stop, the control rod 55 is rapidly inserted to the reactor core 53.

Further, an upper plenum 61 that communicates into the outlet nozzle 45 is formed above the reactor core 53 and a lower plenum 62 is formed below the reactor core 53 in the reactor vessel 41. Further, a downcomer portion 63 that communicates into the inlet nozzle 44 and the lower plenum 62 is formed between the reactor vessel 41 and the core barrel 46. Therefore, the light water flows into the reactor vessel main body 42 from the four inlet nozzles 44, flows downward in the downcomer portion 63 and reaches the lower plenum 62, is guided upward by a spherically-shaped inner surface of the lower plenum 62 and goes upward, passes through the lower core support plate 48, and then flows into the reactor core 53. The light water flowing into the reactor core 53 cools the fuel assembly 54 by absorbing the thermal energy generated from the fuel assembly 54 that constitutes the reactor core 53 while the light water is subjected to high temperature, passes through the upper core plate 47, goes upward to the upper plenum 61, and passes through the outlet nozzle 45 and is discharged.

Such a reactor vessel 41 is constructed of the reactor vessel main body 42 and the reactor vessel cover 43, as described above, and the reactor vessel cover 43 is mounted on an upper portion of the reactor vessel main body 42 in a freely attachable/detachable manner by a plurality of stud bolts 65 and a plurality of nuts 66. In this case, the stud bolt 65 includes, as illustrated in FIG. 7-1 in detail, a lower screw portion 65a, a penetration portion 65b, an upper screw portion 65c, and a parallel groove portion 65d. In a state where the stud bolt 65 having the upper screw portion 65c screwed with the nut 66 has the penetration portion 65b that penetrates a mounting hole 43a formed in the reactor vessel cover 43, and has the lower screw portion 65a screwed in a screw hole 42a formed in the reactor vessel main body 42, the nut 66 is screwed with tension acting on the stud bolt 65 in a shaft center direction (here, upward) away from the reactor vessel main body 42, whereby fastening and loosening can be performed, and the reactor vessel cover 43 can be attached to/detached from the reactor vessel main body 42.

Here, a member to be fastened of the present invention is the reactor vessel main body 42 and the reactor vessel cover 43. Further, the fastening and loosening device of the first embodiment enables the reactor vessel cover 43 to be attached to/detached from the reactor vessel main body 42 using the plurality of stud bolts 65 and nuts 66. Hereinafter, the fastening and loosening device of the first embodiment will be described in detail.

In the first embodiment, as illustrated in FIGS. 1 and 2, a support disk 59a of the housing 59 is supported by a building 11a that constitutes the containment 11 (see FIG. 11) by a plurality of support rods 71. The support disk 59a has a guide rail 72 fixed to an outer peripheral portion, and four conveyance devices (electric trolley hoist) 73 are supported by the guide rail 72 in a freely movable manner. Each of the four conveyance devices 73 has a lift device 74, and the fastening and loosening device 76 is hung from and supported by the conveyance device 73 via a hanging cable 75 and is ascendable/descendable. In this case, the four conveyance devices 73 and fastening and loosening devices 76 have an almost equal configuration and are disposed at even intervals (90-degree intervals) in a circumferential direction.

A conveyance control device 77 is connected with a tension control device 78, and is connected with a power supply unit 79 and an air pressure source 80. Further, the conveyance control device 77 is coupled with each of the conveyance devices 73 and the fastening and loosening devices 76 by a power supply cable 81, and is coupled with each of the fastening and loosening device 76 by an air-pressure hose 82.

The fastening and loosening device 76 has, as described above, the plurality of stud bolts 65 screwed in and arranged in the outer peripheral portions of the reactor vessel main body 42 and the reactor vessel cover 43, has the nuts 66 respectively screwed with the plurality of stud bolts 65, and rotates the nuts 66 with causing tension to act on the stud bolts 65 in the shaft center direction away from the reactor vessel main body 42, so that the fastening and loosening is performed.

That is, the fastening and loosening device 76 is constructed of a device main body 101, a bolt tensioner 102, two guide devices 103, two positioning devices 104, a guide position adjustment device 105, and an insertion position adjustment device 106, as illustrated in FIGS. 3 to 5.

A hanging hook 111 is hangable from/supportable to the hanging cable 75 of the lift device 74 in the conveyance device 73, and a support plate 113 is supported by a plurality of hanging rods 112. The device main body 101 is constructed of the hanging hook 111, the hanging rods 112, the support plate 113, and the like. Therefore, the device main body 101 is, by an upper portion thereof being supported by the conveyance device 73, supported along an arrangement direction of the stud bolts 65 (in a circumference direction of the reactor vessel main body 42 and the reactor vessel cover 43) in a freely movable manner.

The bolt tensioner 102 is supported such that an upper portion thereof penetrates a center portion of the support plate 113, and an oil tank 114, a hydraulic pump unit 115, and a pressure gauge 116 are disposed on the bolt tensioner 102. Therefore, since the bolt tensioner 102 is mounted to the device main body 101, the bolt tensioner 102 is freely movable along the shaft center direction of the stud bolts 65 by an actuation of the lift device 74.

In the bolt tensioner 102, as illustrated in FIG. 6, a housing 201 with a cylindrical shape has an upper portion inserted and fixed to the support plate 113 and has a tip portion capable of coming into contact with an upper surface of the reactor vessel cover 43. A puller bar 202 has a cylindrical shape with a smaller diameter than the housing 201 and is housed in a center portion of the housing 201. The puller bar 202 is fit into an inner peripheral surface of the housing 201 via a piston (not illustrated) in a freely movable manner, and is movable along the shaft center direction (vertical direction) by oil pressure supplied/discharged by the hydraulic pump unit 115. Further, the puller bar 202 has a parallel groove portion 202a formed in a lower end portion.

A puller bar socket 203 has a cylindrical shape divided in quarters in a circumferential direction, and is disposed between the housing 201, and a lower end portion of the puller bar 202 and the stud bolt 65. The puller bar socket 203 has an upper end portion supported by a lower portion of the puller bar 202 via a collar 204, and each of the quartered members is freely movable in the circumferential direction and is outwardly energized and supported. Further, the puller bar socket 203 has an upper engagement groove portion 203a formed on an upper inner peripheral surface, the upper engagement groove portion 203a being engaged with the parallel groove portion 202a of the puller bar 202, and has a lower engagement portion 203b formed on a lower inner peripheral surface, the lower engagement portion 203b being engaged with the parallel groove portion 65d of the stud bolt 65. Also, the puller bar socket 203 has an uneven portion 203c formed on an outer peripheral surface.

Further, a locking ring 205 has a cylindrical shape and is disposed between the housing 201 and the puller bar socket 203. The locking ring 205 has an uneven portion 205a formed in an inner peripheral surface, the uneven portion 205a being capable of fitting into the uneven portion 203c of the puller bar socket 203. Further, the locking ring 205 is ascendable/descendable by a plurality of air cylinders 206 mounted on an inner peripheral surface of the housing 201. Therefore, when the locking ring 205 is at an ascended position, as illustrated in the left side of FIG. 6, the puller bar socket 203 is moved outward in a radial direction, and the uneven portion 205a is fit into the uneven portion 203c of the puller bar socket 203. The engagement groove portions 203a and 203b are not engaged with the parallel groove portion 202a of the puller bar 202 and the parallel groove portion 65d of the stud bolt 65. Meanwhile, when the locking ring 205 is at a descended position, as illustrated in the right side of FIG. 6, the uneven portion 205a presses the uneven portion 203c of the puller bar socket 203, and the puller bar socket 203 is moved inward in the radial direction. The engagement groove portions 203a and 203b are engaged with the parallel groove portion 202a of the puller bar 202 and the parallel groove portion 65d of the stud bolt 65.

The housing 201 has a nut socket 207 supported by a lower end inner peripheral portion thereof in a freely rotatable manner, and has a driven gear 208 fixed to an outer peripheral portion. The nut socket 207 is, with respect to the nut 66, freely relatively movable in a shaft center direction while being freely integrally rotatable in a circumferential direction. Further, the housing 201 has a nut rotating device 209 mounted to a lower end outer peripheral portion, the nut rotating device 209 rotating the nut socket 207. The nut rotating device 209 is constructed of a case 210 fixed to the housing 201, an electric servo motor 211, a drive gear 212, and three intermediate gears 213. Therefore, when the drive gear 212 is forwardly rotated by the electric servo motor 211, rotational driving force is transmitted to the driven gear 208 via each of the intermediate gears 213, rotates the nut socket 207, and rotates and fastens the nut 66. Meanwhile, when the drive gear 212 is backwardly rotated by the electric servo motor 211, the rotational driving force is transmitted to the driven gear 208 via each of the intermediate gears 213, rotates the nut socket 207, and rotates and loosens the nut 66.

Therefore, first, as illustrated in FIG. 7-1, the fastening and loosening device 76 is moved by the conveyance device 73, and is stopped at a predetermined position, that is, stopped at a position of the bolt tensioner 102, the stud bolt 65, and the nut 66. Next, as illustrated in FIG. 7-2, the fastening and loosening device 76 is descended by the lift device 74 to cause the bolt tensioner 102 to be engaged with the stud bolt 65 and the nut 66. Then, as illustrated in FIG. 7-3, the puller bar socket 203 is moved inward in a radial direction to chuck the parallel groove portion 65d of the stud bolt 65. Under this condition, as illustrated in FIG. 7-4, the puller bar 202 is ascended by actuation of the hydraulic pump unit 115 to cause tension to act on the stud bolt 65 in the shaft center direction (upward) away from the reactor vessel main body 42. Then, as illustrated in FIG. 7-5, the nut socket 207 is rotated by actuation of the nut rotating device 209, so that the nut 66 is rotated, and fastening or loosening can be performed.

Further, the fastening and loosening device 76 is, as illustrated in FIGS. 3 to 5, provided with the guide devices 103 before and behind the bolt tensioner 102 in the moving direction of the device main body 101. The before and behind guide devices 103 have a symmetrical shape with respect to a center line of the bolt tensioner 102, and have an almost equal configuration.

That is, main bodies of before and behind cylinders 121 are fixed to the support plate 113, and tip portions of piston rods 121a that extend downward are respectively coupled with box bodies 122 that have an inverted U-shape cross section. Note that a most extended position of the piston rod 121a of the cylinder 121 is controlled. The box body 122 has, as illustrated in FIG. 8 in detail, an inner guide member 123 and an outer guide member 124 mounted on both the right and left sides of the moving direction of the device main body 101. The guide members 123 and 124 have guide pieces 125 and 126 respectively fixed to sides facing each other, and the guide pieces 125 and 126 have a curved shape along the arrangement direction (a circumferential direction) of the stud bolts 65. In this case, each of the guide pieces 125 and 126 is contactable with outer peripheries of two (or three or more) adjacent nuts 66. Further, the guide members 123 and 124 have guide rollers 127 and guide rollers 128 mounted to a front side end portion and a back side end portion, respectively, the guide rollers 127 and the guide rollers 128 having rotating shaft centers along a vertical direction, respectively.

In this case, the box bodies 122, the guide members 123 and 124, the guide pieces 125 and 126, the guide rollers 127 and 128, and the like constitute the guide devices 103. Further, the cylinder 121 functions as a damper by being filled with oil, and even if the bolt tensioner 102 is ascended together with the device main body 101, the device main body 101 and the guide device 103 relatively moves by extension/retraction of the piston rod 121a. Further, the two guide devices 103 have box bodies 122 coupled with each other by two upper and lower coupling members 129 at an outside of the circumferential direction, and predetermined rigidity is secured.

Therefore, the guide pieces 125 and 126 and the guide rollers 127 and 128 of the guide members 123 and 124 can guide a lower portion of the device main body 101 by contacting the outer periphery of each of the nuts 66 screwed with the stud bolts 65 from both the right and left sides of the moving direction of the device main body 101.

Further, the fastening and loosening device 76 is, as illustrated in FIGS. 3 and 5, provided with the positioning devices 104 together with the guide devices 103 before and behind the bolt tensioner 102 in the moving direction of the device main body 101. The before and behind positioning devices 104 are mounted on the guide devices 103, and have a symmetrical shape with respect to a center line of the bolt tensioner 102, and have an almost equal configuration.

That is, a box-type case 131 is fixed to a side portion (an outside of the circumferential direction of the reactor vessel cover 43) of the box body 122 of the guide device 103, and an air cylinder 132 is mounted in the case 131. The air cylinder 132 has a piston rod 132a (see FIG. 8) extendable/retractable toward an inner side of the circumferential direction of the reactor vessel cover 43, and has a positioning member 133 mounted to a tip portion between the adjacent nuts 66, the positioning member being inserted from an outside of the circumferential direction. Further, the case 131 has a wheel 134 mounted on a lower portion at a box body 122 side, and a load of the guide device 103 and the positioning device 104 is supported by the wheel 134. The case 131 is rollable on an upper surface of the reactor vessel cover 43.

In this case, the case 131, the air cylinder 132, the positioning member 133, and the like constitute the positioning device 104.

Therefore, when the air cylinder 132 is actuated to extend the piston rod 132a at a predetermined position, the positioning member 133 is inserted between the adjacent nuts 66, whereby the device main body 101 can be positioned to a predetermined position with respect to the moving direction thereof.

Note that an extended amount detection device 141 that detects extended amounts of the stud bolt 65 before and after the work by the fastening and loosening device is provided in the box body 122 of a front-side guide device 103, and whether the tension has been properly caused to act on the bolt tensioner 102 and fastening has been performed is detected based on a detection result of the extended amount detection device 141. Further, a nut detection sensor (optical sensor) 142 that detects the nut 66 is provided in the box body 122 of the front-side guide device 103, and a rotary encoder 143 that detects the number of rotation of the wheel 134 is provided in the case 131 of the positioning device 104. A position where the device main body 101 is moved, that is, a position where the bolt tensioner 102 is moved is detected based on a detection result of the nut detection sensor 142 and the rotary encoder 143.

Further, in the first embodiment, as illustrated in FIGS. 9 and 10, the guide device 103 is provided with the guide position adjustment device 105 capable of moving the inner guide member 123 in a horizontal direction intersecting with the moving direction of the device main body 101, that is, in an inward and outward direction nearly perpendicular to the circumferential direction. Further, at the positioning device 104, the insertion position adjustment device 106 is provided, which is capable of adjusting a position where the positioning members 133 (133a and 133b) is inserted.

Typically, a differs in size depending on a position where the reactor vessel is disposed, a power generation capacity of a plant, and the like, and outer diameters of the reactor vessel main body 42 and the reactor vessel cover 43, outer diameters and the number of the stud bolts 65 and the nuts 66, and the like differ. Therefore, it is necessary to adjust positions of the guide device 103 and the positioning device 104 according to the outer diameters and an arranged condition of the stud bolts 65 and the nuts 66.

At the guide position adjustment device 105, the inner guide member 123 is supported by a support shaft 152 in a freely horizontally movable manner to the mounting bracket 151, one end portion of which (bolt tensioner 102 side) is fixed to the box body 122 and the other end portion of which is swingably supported by an eccentric mechanism 153 provided in the box body 122. At the eccentric mechanism 153, the mounting bracket 154 is provided with a rotating body 155 fixed to the box body 122, and the rotating body 155 is supported by a rotation shaft 156 fixed to the mounting bracket 154 in a freely rotatable manner. Further, in the rotating body 155, an eccentric body 157 that the rotation shaft 156 penetrates is formed, and a base end portion of the support arm 158 is engaged with an outer peripheral portion of the eccentric body 157, and a tip portion of the support arm 158 is coupled with the other end portion of the inner guide member 123 by a coupling shaft 159. Further, the rotating body 155 has an operating handle 160 mounted thereon, the box body 122 is provided with stoppers 161a and 161b of the operating handle 160 and the mounting bracket 154 is provided with lock pins 162a and 162b of the operating handle 160 in a freely attachable/detachable manner.

Therefore, in a case where the arranged position of the stud bolt 65 and the nut 66 illustrated in FIG. 9 and the arranged condition of the stud bolt 65 and the nut 66 illustrated in FIG. 10 differ, it is necessary to adjust positions of the inner guide members 123 by the guide position adjustment devices 105 according to respective arranged conditions. That is, when the operating handle 160 is rotated in a clockwise direction by 180 degrees from the condition illustrated in FIG. 9, the integrated eccentric body 157 is rotated similarly, and as illustrated in FIG. 10, the inner guide member 123 can be moved to an outside of the circumferential direction via the support arm 158 by the eccentricity of the eccentric body 157. Also, when the operating handle 160 is rotated in the counterclockwise direction by 180 degrees from the condition illustrated in FIG. 10, the inner guide member 123 can be, in a similar manner to the above, moved to an inside of the circumferential direction via the support arm 158 by the eccentricity of the eccentric body 157.

Further, at the insertion position adjustment device 106, as illustrated in FIGS. 9 and 10, the air cylinder 132 has the positioning member 133 mounted on a tip portion of the piston rod 132a, and the positioning member 133 is exchangeable according to the arranged positions of the stud bolt 65 and the nut 66. The two positioning members 133a and 133b have support plates 171a and 171b freely attachable to/detachable from a tip portion of the piston rod 132a by coupling pins 172a and 172b. The support plates 171a and 171b have two positioning rollers 173a and 173b supported by a tip portion side in a freely rotatable manner, and contactable with an outer peripheral surface of an adjacent nut 66. In this case, the two positioning members 133a and 133b differ in the positions where the positioning rollers 173a and 173b are mounted with respect to the support plates 171a and 171b. The positions where the positioning rollers 173a and 173b are mounted are set according to the condition of arrangement of the stud bolts 65 and the nuts 66.

Here, an actuation of the above-described fastening and loosening device of the first embodiment will be described.

In the fastening and loosening device of the first embodiment, as illustrated in FIGS. 1 and 2, when the reactor vessel cover 43 is removed from the reactor vessel main body 42, first, the fastening and loosening devices 76 are hung from and supported by the four conveyance devices 73 via the lift devices 74, and the fastening and loosening device 76 is descended by the lift devices 74, so that the fastening and loosening device 76 is set up with respect to the stud bolts 65 and the nuts 66 fastened to the reactor vessel main body 42 and the reactor vessel cover 43. Then, the bolt tensioner 102 is ascended together with the device main body 101, and the bolt tensioner 102 is arranged above the stud bolts 65 and the nuts 66. In this case, the before and behind guide devices 103 are engaged with the arranged nuts 66.

Under this condition, the conveyance device 73 is actuated, and the fastening and loosening device 76 is moved along the arrangement direction of the stud bolts 65 and the nuts 66. Then, when the bolt tensioner 102 is moved to a position where the bolt tensioner 102 vertically faces the stud bolts 65 and the nuts 66, the actuation of the conveyance device 73 is stopped, and positioning of the bolt tensioner 102 is performed by an actuation of the positioning device 104. That is, the bolt tensioner 102 is merely hung from the conveyance device 73 together with the device main body 101, and a gap is provided between the guide device 103 and the nut 66 for the movement of the guide device 103. Therefore, accurate positioning between the bolt tensioner 102, and the stud bolt 65 and the nut 66 is difficult. Therefore, when the positioning device 104 is actuated, and the positioning member 133 is inserted between the adjacent nuts 66 from outside, and the positioning device 104 (positioning member 133) and the guide device 103 (inner guide member 123) sandwiches the nuts 66, so that the accurate positioning of the bolt tensioner 102 becomes possible.

When the accurate positioning between the bolt tensioner 102, and the stud bolts 65 and the nuts 66 is completed, under this condition, the nut 66 is loosened by actuation of the bolt tensioner 102. That is, the nut 66 is backwardly rotated and loosened with tension acting on the stud bolt 65 in the shaft center direction away from the reactor vessel main body 42.

When loosening of one nut 66 is completed, the bolt tensioner 102 is ascended by the lift device 74 together with the device main body 101, and the bolt tensioner 102 is upwardly away from the stud bolts 65 and the nuts 66. At this time, the cylinder 121 is extended due to the weights of the guide device 103, the positioning device 104, and the like, so that the before and behind guide devices 103 and the positioning device 104 are engaged with the arranged nuts 66. Under this condition, as described above, when the fastening and loosening device 76 is moved along the arrangement direction of the stud bolts 65 and the nuts 66 by the conveyance device 73, the guide device 103 and the positioning device 104 are rolled on an upper surface of the reactor vessel cover 43 by the wheel 134. Then, when the bolt tensioner 102 is moved to a position where the bolt tensioner 102 vertically faces the stud bolts 65 and the nuts 66, the actuation of the conveyance device 73 is stopped. The plurality of nuts 66 is loosened one by one by repetition of works similar to the above description.

Note that the four fastening and loosening devices 76 are disposed at even intervals in the circumferential direction, and the fastening and loosening devices 76 are actuated in synchronization with each other, whereby the nuts 66 can be loosened without action of an offset load on the stud bolts 65 and the nuts 66 fastened to the reactor vessel main body 42 and the reactor vessel cover 43. Then, when the loosening work of all nuts is completed, the four conveyance devices 73 are stopped, the lift devices 74 are actuated and all of the fastening and loosening devices 76 are hung, and all of the fastening and loosening devices 76 are removed using a crane device (not illustrated). Then, after the stud bolts 65 are rotated and removed using a rotating device (not illustrated), the reactor vessel cover 43 is removed from the reactor vessel main body 42 by a crane device.

Meanwhile, when the reactor vessel cover 43 is mounted on the reactor vessel main body 42, the process is similar to the above-described actuation. However, the rotation direction of the nuts 66 in the bolt tensioner 102 is opposite.

Further, when the fastening and loosening device of the first embodiment is applied to another reactor vessel 41, since the arrangements of the stud bolts 65 and the nuts 66 differ, the position of the inner guide member 123 is adjusted by the guide position adjustment device 105 and the positioning members 133a and 133b are exchanged by the insertion position adjustment device 106, in advance. Therefore, even if the arrangements of the stud bolts 65 and the nuts 66 differ, one guide device 103 and a positioning device 104 can be used by using the guide position adjustment device 105 and the insertion position adjustment device 106.

In this way, the fastening and loosening device of the first embodiment is provided with the device main body 101, an upper portion of which is supported along the arrangement direction of the stud bolts 65 by the conveyance device 73 in a freely movable manner, the bolt tensioner 102 freely ascendable/descendable with respect to the stud bolts 65 by the lift device 74 together with the device main body 101, the guide device 103 having the right and left guide members 123 and 124 coupled with the device main body 101 via the cylinder 121 in a freely relatively movable manner and contactable with the outer periphery of the nut 66 from both the right and left sides of the moving direction of the device main body 101, and the guide position adjustment device 105 capable of moving the inner guide member 123 in the horizontal direction intersecting with the moving direction of the device main body 101.

Therefore, the right and left guide members 123 and 124 can guide the device main body 101 by contacting with the outer periphery of the nut 66 from the both sides of the device main body 101, and the inner guide member 123 is moved in the horizontal direction intersecting with the moving direction of the device main body 101 by the guide position adjustment device 105, whereby the guide position of the inner guide member 123 to the nut 66 is adjusted. Therefore, the inner guide member 123 can properly guide the device main body 101 regardless of the size and shape of the stud bolt 65 and the nut 66. As a result, fastening and loosening of the nut 66 with respect to the stud bolt 65 can be properly performed.

Further, in the fastening and loosening device of the first embodiment, since the arrangement direction of the stud bolts 65 is the circumferential direction along the outer peripheral portion of the reactor vessel main body 42 and the reactor vessel cover 43, the inner guide member 123 in the guide device 103 can be moved by the guide position adjustment device 105. Therefore, the inner guide member 123 is moved by the guide position adjustment device 105, whereby the guide position of the inner guide member 123 with respect to the nut 66 is adjusted, and the position adjustment of the inner guide member 123 can be easily performed with a simple configuration. Further, the guide position adjustment device 105 can be disposed at an inner guide member 123 side, and therefore, an outward protrusion can be eliminated and complication of the device can be prevented.

Also, the fastening and loosening device of the first embodiment is provided with the positioning device 104 having the positioning member 133 inserted between the adjacent nuts 66 from an outside of the circumferential direction. Therefore, the positioning member 133 is inserted between the nuts 66 by the positioning device 104 from an opposite side of the inner guide member 123, so that the nut 66 is sandwiched by the inner guide member 123 and the positioning member 133, and the proper positioning of the device main body 101 can be performed.

Further, the fastening and loosening device of the first embodiment is provided with the insertion position adjustment device 106 capable of adjusting the insertion position of the positioning member 133. Therefore, the insertion position adjustment device 106 can adjust the insertion position by exchanging the positioning members 133a and 133b. Therefore, the positioning members 133a and 133b can properly position the device main body 101 regardless of the size and shape of the stud bolts 65 and the nuts 66. As a result, fastening and loosening of the nuts 66 with respect to the stud bolts 65 can be properly performed.

Also, the fastening and loosening device of the first embodiment is, as the guide position adjustment device 105, provided with the support shaft 152 that supports one end portion of the inner guide member 123 in a freely rotatable manner and the eccentric mechanism 153 that allows the other end portion of the inner guide member 123 to be movable. Therefore, the guide position of the inner guide member 123 can be easily changed only by simply actuating the eccentric mechanism 153, and the device can be simplified.

Further, the fastening and loosening device of the first embodiment is provided with the guide devices 103 before and behind the bolt tensioner 102 in the moving direction of the device main body 101, and the outer and inner guide members 123 and 124 are contactable with the outer peripheries of the two or more nuts 66. Therefore, the movement of the device main body 101 is guided before and behind the bolt tensioner 102 by the guide devices 103, whereby the device can be stably moved and guided.

Note that, in the above-described first embodiment, the guide device 103 has been constructed of the box body 122, the guide members 123 and 124, the guide pieces 125 and 126, the guide rollers 127 and 128, and the like. However, the configuration is not limited to the above-described configuration. For example, the guide device 103 may be simply constructed of the guide members 123 and 124 only, or of the guide pieces 125 and 126 only. Alternatively, the guide device 103 may be constructed of a plurality of guide rollers.

Further, in the first embodiment, only one end portion of the inner guide member 123 has been moved in the guide position adjustment device 105. However, the eccentric mechanism 153 may be provided in the other end portion of the inner guide member 123 so that the guide member as a whole may be caused to be movable. Further, not only the inner guide member 123 but also the outer guide member 124 may be provided with a guide position adjustment device and may be caused to be movable. The guide position adjustment device 105 is not limited to the eccentric mechanism 153. The guide member may be caused to be movable with a long hole and may be fixed at a predetermined position by a lock pin. Further, a rack and pinion mechanism, a boll screw mechanism, or the like may be applied to the motor.

Further, in the above-described first embodiment, the positioning device 104 has been constructed of the case 131, the air cylinder 132, the positioning member 133, and the like. However, the configuration is not limited to the above-described configuration. For example, a hydraulic cylinder, an electric motor, or the like may be used in place of the air cylinder 132. Further, the positioning members 133 (133a and 133b) have been constructed of the support plates 171a and 171b, the positioning rollers 173a and 173b, and the like. However, the configuration is not limited to the above-described configuration. For example, the number of the positioning rollers 173a and 173b is not limited to two, but may be one, or three or more. An insertion member having a tapered tip portion may be employed in place of the positioning rollers 173a and 173b.

Further, in the first embodiment, the insertion position adjustment device 106 has been constructed of two exchangeable positioning members 133 (133a and 133b). However, the configuration is not limited to the above-described configuration. For example, three or more exchangeable positioning members may be provided, a positioning member that is freely horizontally swingable within a predetermined angle may be mounted on the tip portion of the piston rod 132a of the air cylinder 132, or, the position where the air cylinder 132 is mounted may be movable or swingable along the moving direction of the device main body 101.

Second Embodiment

Figure 13:
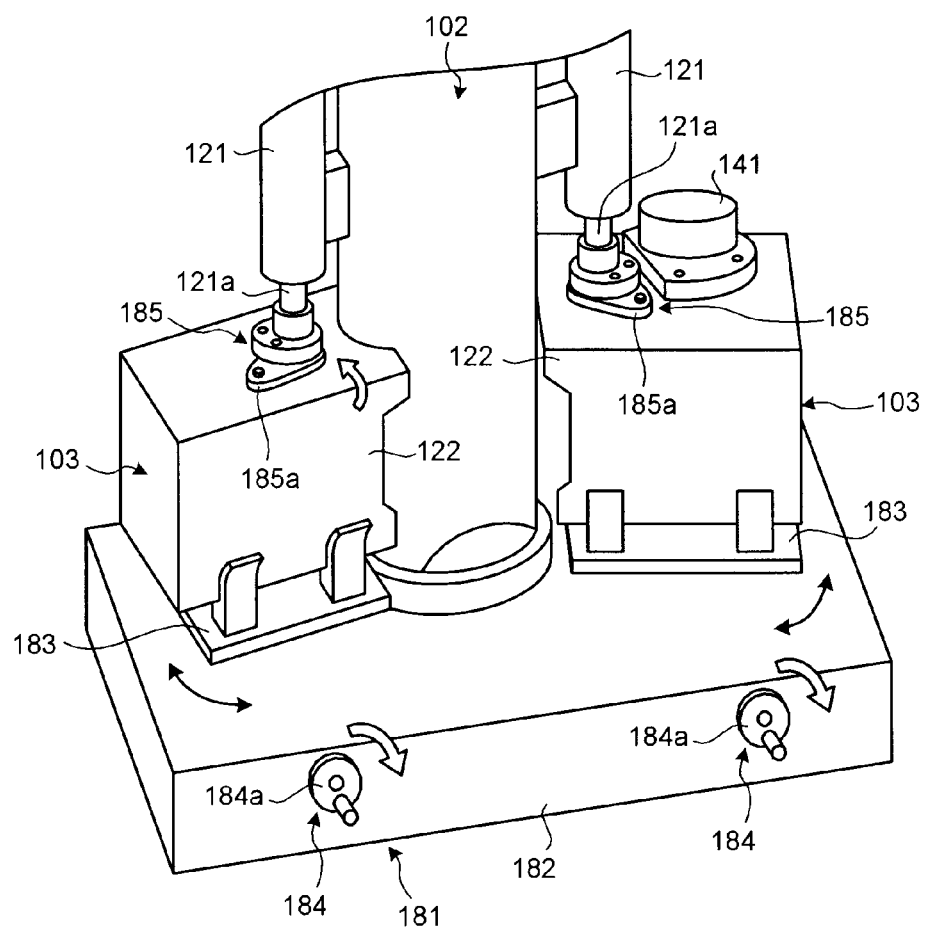
FIG. 13 is a schematic view illustrating a guide position adjustment device in a fastening and loosening device according to a second embodiment of the present invention.
Figure 14:
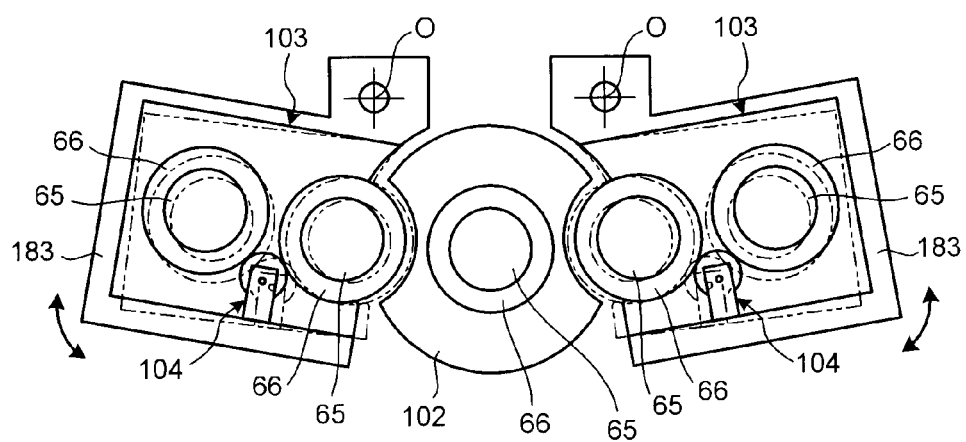
FIG. 14 is a plan view illustrating the guide position adjustment device of the second embodiment.

FIG. 13 is a schematic view illustrating a guide position adjustment device in a fastening and loosening device according to a second embodiment of the present invention, and FIG. 14 is a plan view illustrating the guide position adjustment device of the second embodiment. Note that members having similar functions to the above-described embodiment will be denoted with the same reference signs and detailed description is omitted.

In a fastening and loosening device of the second embodiment, as illustrated in FIG. 13 and FIG. 14, a guide position adjustment device 181 allows a box body 122 of a guide device 103 to be horizontally swingable.

That is, the guide position adjustment device 181 includes a movement adjustment base plate 182, two guide plates 183, an adjustment mechanism 184, and an eccentric mechanism 185. The movement adjustment base plate 182 has two guide plates 183 placed on an upper surface portion, and the guide device 103 is placeable on each of the guide plates 183. The adjustment mechanism 184 is housed inside the movement adjustment base plate 182, and the guide plate 183 can be horizontally rotated around a virtual shaft center O by rotation of a handle 184a. Note that a specific configuration of the adjustment mechanism 184 can be a typical one, and for example, may be one that horizontally rotates the guide plate 183 by rotating a worm wheel that meshes with a worm. The eccentric mechanism 185 has an eccentric body 185a to which a tip portion of a piston rod 121a of a cylinder 121 is fit and an outer peripheral portion of which is fit to the box body 122. Note that the eccentric mechanism 185 has an almost equal configuration to the eccentric mechanism 153 of the first embodiment.

Therefore, the guide device 103 is ascended by a crane device (not illustrated) via a device main body 101 (see FIG. 3), and the guide device 103 is mounted on each of the guide plates 183 on the movement adjustment base plate 182. Then, with respect to the box body 122 of the guide device 103, after the piston rod 121a of the cylinder 121 is removed, the guide device 103 is rotated together with the guide plate 183 by rotation of the handle 184a, and a position of the guide plate 183 is adjusted. When the position adjustment work of the guide device 103 is completed, a position where the cylinder 121 and the box body 122 are coupled is adjusted by rotation of the eccentric body 185a of the eccentric mechanism 185, and the piston rod 121a of the cylinder 121 is attached to the box body 122 of the guide device 103.

Note that, although the two guide devices 103 are coupled by a coupling member 129, the coupling member 129 may be removed before the position adjustment work of the guide device 103 and another coupling member may be attached after the work.

In this way, the fastening and loosening device of the second embodiment allows the box body 122 of the guide device 103 to be horizontally swingable by the guide position adjustment device 181. Therefore, the guide device 103 as a whole is swung via the box body 122 by the guide position adjustment device 181 to adjust the position of the guide member. Versatility can be improved by sufficiently securing a position adjustment margin.

Note that, in the above-described second embodiment, the guide device 103 has been horizontally rotated around the virtual shaft center O at an outside of the guide device 103. However, the configuration is not limited to the above-described configuration. For example, the guide device 103 may be horizontally rotated around a position where the piston rod 121a of the cylinder 121 is mounted with respect to the box body 122 of the guide device 103, and in this case, the eccentric mechanism 185 becomes unnecessary and the structure can be simplified. Alternatively, the guide position adjustment device may be simply constructed only of the eccentric mechanism 185.

Further, in the above-described embodiments, description has been given in which the fastening and loosening device of the present invention is applied to a reactor vessel 41. However, the member to be fastened is not limited to the above-described member, and any member is applicable as long as the plurality of stud bolts and nuts is arranged along a predetermined direction.

REFERENCE SIGNS LIST

11 Containment
12 Pressurized water reactor
13 Steam generator
17 Steam turbine
21 Generator
41 Reactor vessel
42 Reactor vessel main body (member to be fastened)
43 Reactor vessel cover (member to be fastened)
46 Core barrel
53 Reactor core
54 Fuel assembly
55 Control rod
58 Control rod driving mechanism
59 Housing
65 Stud bolt
66 Nut
73 Conveyance device
74 Lift device
76 Fastening and loosening device
101 Device main body
102 Bolt tensioner
103 Guide device
104 Positioning device
105 and 181 Guide position adjustment device
106 Insertion position adjustment device
123 Inner guide member
124 Outer guide member
125 and 126 Guide piece
127 and 128 Guide roller
132 Air cylinder
133, 133a, and 133b Positioning member
153 Eccentric mechanism

The invention claimed is:

1. A fastening and loosening device having a plurality of stud bolts screwed into an object to be fastened and a plurality of nuts respectively screwed onto the stud bolts, the device configured to rotate a respective nut, causing tension to act on a respective stud bolt, in a shaft center direction, away from the object to be fastened, to perform fastening or loosening, the fastening and loosening device comprising:
   a device main body having an upper portion movably supported along an arrangement direction of the stud bolts;
   a bolt tensioner supported by the device main body and being freely movable along the shaft center direction of the stud bolts;
   a guide device provided in a lower portion of the device main body and having right and left guide members contactable with an outer periphery of the nut from both right and left sides of a moving direction of the device main body; and
   a guide position adjustment device capable of moving at least one of the right and left guide members in a horizontal direction intersecting with the moving direction of the device main body.

2. The fastening and loosening device according to claim 1, wherein the arrangement direction of the stud bolts is a circumferential direction along an outer periphery of the object to be fastened, and the guide device allows the guide member positioned at an inner side of the circumferential direction to be movable by the guide position adjustment device.

3. The fastening and loosening device according to claim 2, further comprising a positioning device having a positioning member inserted between adjacent nuts from an outside of the circumferential direction.

4. The fastening and loosening device according to claim 3, further comprising an insertion position adjustment device capable of adjusting an insertion position of the positioning device.

5. The fastening and loosening device according to claim 1, wherein the guide position adjustment device includes a support shaft supporting one end portion of the guide member in a freely rotatable manner, and an eccentric mechanism allowing the other end portion of the guide member to be movable.

6. The fastening and loosening device according to claim 1, wherein the guide device is constructed of the right and left guide members fixed to a lower portion of a box body with a predetermined interval, and the guide position adjustment device is capable of horizontally swinging the box body.

7. The fastening and loosening device according to claim 1, wherein the right and left guide members are provided in front and behind the bolt tensioner in the moving direction of the device main body, and the right and left guide members are contactable with the outer peripheries of two or more of the nuts.

8. A fastening and loosening method for a fastening and loosening device having a plurality of stud bolts screwed into an object to be fastened and a plurality of nuts respectively screwed onto the stud bolts, the device configured to rotate a respective nut, causing tension to act on a respective stud bolt, in a shaft center direction, away from the object to be fastened, to perform fastening or loosening, the method comprising:
   providing a device main body having an upper portion movably supported along an arrangement direction of the stud bolts;
   providing a bolt tensioner supported by the device main body and being freely movable along the shaft center direction of the stud bolts; providing a guide device provided in a lower portion of the device main body and having right and left guide members contactable with an outer periphery of the nut from both right and left sides of a moving direction of the device main body; and providing a guide position adjustment device capable of moving at least one of the right and left guide members in a horizontal direction intersecting with the moving direction of the device main body.

* * * * *